Oct. 16, 1956 C. F. CHUBB 2,767,363
LIMIT-STOP CONTROL SYSTEM
Filed Sept. 10, 1953 2 Sheets-Sheet 1

INVENTOR
CHARLES F. CHUBB
BY
ATTORNEY

Oct. 16, 1956  
C. F. CHUBB  
2,767,363  
LIMIT-STOP CONTROL SYSTEM  
Filed Sept. 10, 1953  
2 Sheets-Sheet 2
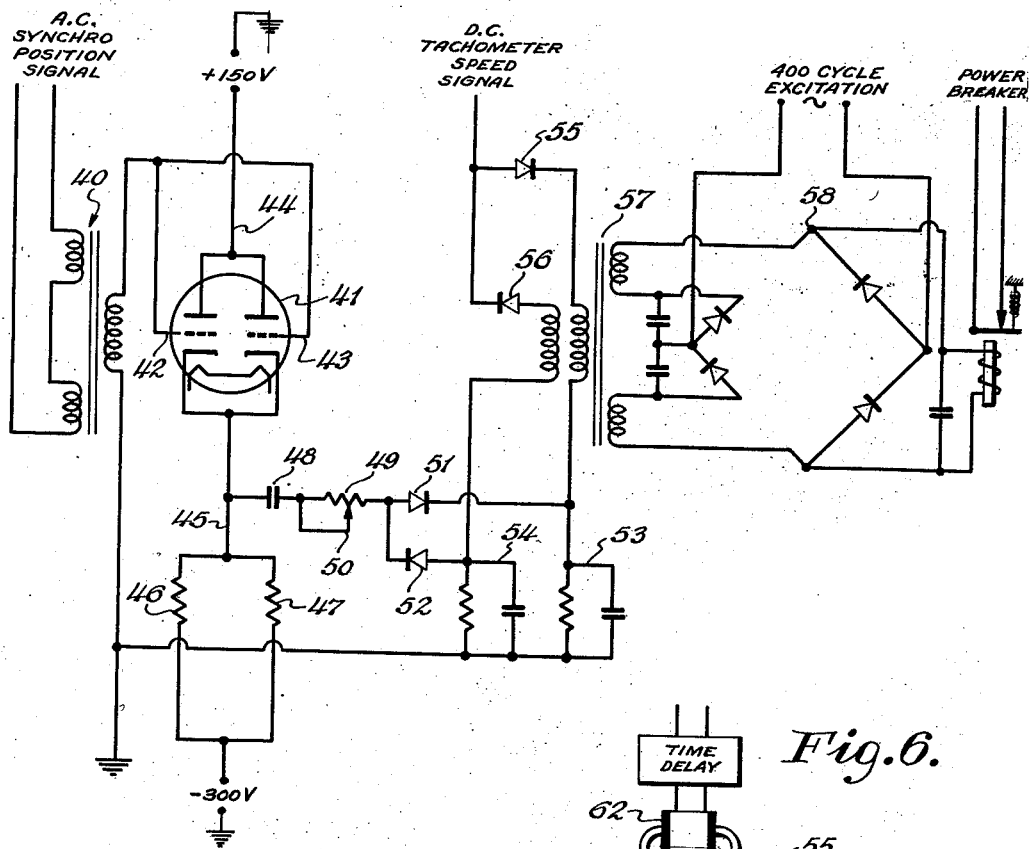
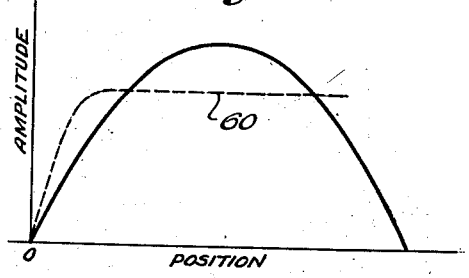
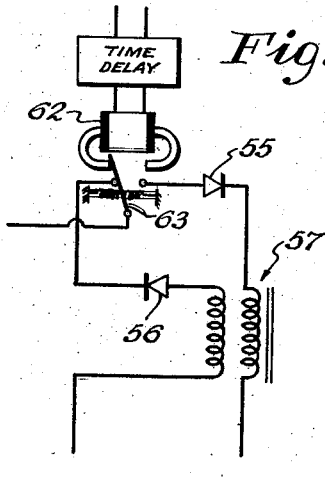
INVENTOR
CHARLES F. CHUBB
BY
ATTORNEY ns for a particular system operating in accordance with
the present invention;

United States Patent Office
2,767,363
Patented Oct. 16, 1956

2,767,363
LIMIT-STOP CONTROL SYSTEM

Charles F. Chubb, Douglaston, N. Y., assignor to Sperry Rand Corporation, a corporation of Delaware Application September 10, 1953, Serial No. 379,439

18 Claims. (Cl. 318—261)

This invention pertains to a system for the control of a driven object or apparatus having its span of movement established by known limits. More particularly, the present invention is directed to the control by electrical means of a driven object of considerable mass and resulting momentum where the use of more conventional mechanical limit stops are inadequate to effect efficient deceleration of such a driven object.

Typical limit stop devices of the prior art are those of a purely mechanical form, mechanically actuated electrical switch means, or an electrical control device which responds to the rate of movement of the driven object to effect timely deceleration as the object approaches the point at which it is desired to limit its movement.

Mechanical limit stops may be partially or wholly ineffectual to limit the movement of a large driven object without some resultant damage. Mechanically operated electrical controls can only actuate a decelerating means at the same point in the object's span of movement regardless of speed. Consequently, if an object is driven at varying speeds, the ultimate limits of the driven object's movement will vary as a function of its speed. It is apparent that under these conditions a driven object will never reach the same ultimate limits of movement, with the result that the scope and efficacy of the driven object, such as a radar scanner, may be seriously and needlessly restricted so that the full design capabilities of the over-all system are not realized. A similar limitation of usefulness is present where a limit stop actuating device is responsive to a signal of either the rate of movement of the driven object or its position within the desired span of movement when either of these latter criteria are used individually as a control actuating means.

The present invention utilizes signals respectively representative of the velocity of the driven object and its positional disposition in order to control deceleration or a braking means. In accordance with the present invention a desirable ratio of positional signal to velocity signal may be chosen or designed into the system so as to effect adequate and timely deceleration of the driven object such as that afforded by dynamic braking means or similar deceleration controls.

Additionally, in accordance with the present invention, the proportionality of positional signal to velocity signal which will effect proper deceleration may be readily changed or varied by one of several means as will appear more fully hereinafter.

It is, the object of this invention, therefore, to effect the deceleration of a driven object in accordance with its position within the limits of its span of movement and its instantaneous velocity as both of these factors should be considered to provide adequate control under various loads, speeds or ranges of movement. Other objects and features of the invention will be apparent from the following description of typical embodiments of the invention and the illustrative drawings pertaining thereto in which:

Fig. 4 is a schematic diagram of a second preferred embodiment of the present invention;

Fig. 5 is a graphic illustration similar to Fig. 2 of the amplitude vs. position characteristics of the signal generators in another embodiment of the present invention;

Fig. 6 is a schematic diagram of a reversible switch arrangement employed in one embodiment of the present invention.

A typical application of the present invention may be to drive the radiant energy reflector of a radar apparatus for scanning purposes. A reflector such as that shown in Fig. 1 may be, for instance, driven in an oscillatory motion within fixed limits about one or more axes. The limits of movement of such a radar reflector 1 as is illustrated in Fig. 1 would depend largely upon the design characteristics of the radar apparatus as a whole.

Figure 1:
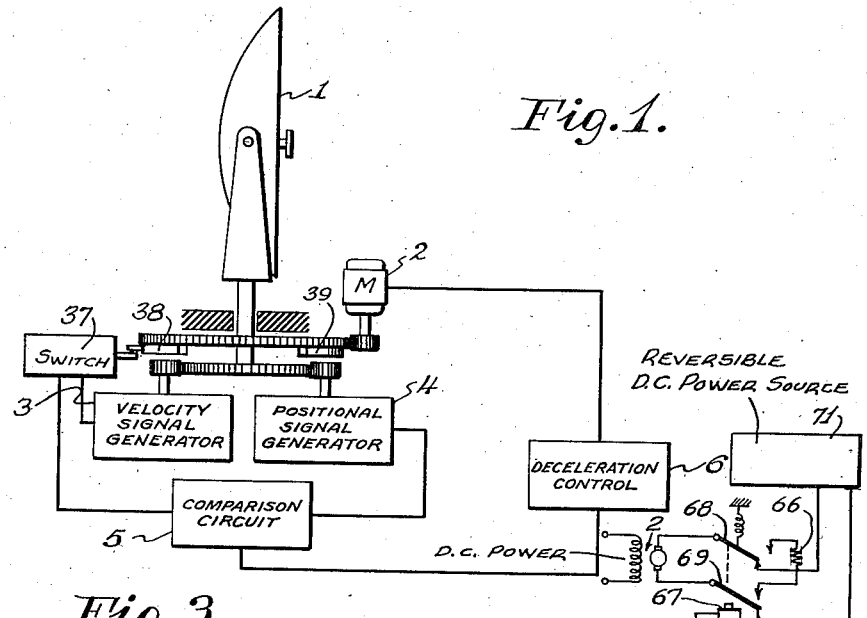
Fig. 1 is a block diagram of one embodiment of the present invention.

However, it may be assumed that a given set of limits for movement of the radar reflector about an azimuthal axis, such as is illustrated in Fig. 1, has been established and it is desired to have the radar reflector oscillate within that set of limits regardless of its velocity and without sacrificing any of its span of operation by coming to a stop short of one or both limits.

In accordance with the present invention, a drive motor 2 of reversible type is adapted to drive the object or apparatus in either azimuthal direction within the established limits. A velocity signal generator 3 and a positional signal generator 4 generate electrical signals which are respectively proportional to the velocity of the driven object at any given instant and to the position of the driven object with respect to the established limits of its desired movement. These two electrical signals are fed to a comparison circuit 5 wherein a determinable ratio of the positional signal and velocity signal cause an actuating signal to be transmitted to deceleration control 6 which effects braking, e. g., dynamic braking of the drive motor 2. The velocity signal and positional signal may be of either an alternating current or direct current type, as will be shown in the several specific embodiments of the invention to be described herein.

A switch 37 is interposed between the source of the velocity signal generator 3 and its connection to the comparison circuit 5. Cams 38 and 39, which are affixed to the platform of the driven object 1, actuate the switch 37 in a manner which will be more fully explained hereinafter in connection with more specific embodiments of the present invention. It may be assumed for present purposes of explaining the ratio relationship between the velocity and positional signals, that the velocity signal is directly connected through switch 37 and impressed upon the comparison circuit 5 without interruption.

Figure 2:
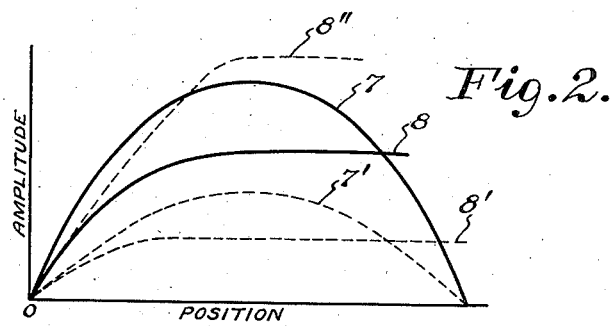
Fig. 2 is a graphic illustration of the amplitude vs. position characteristics of the positional and velocity signals for a particular system operating in accordance with the present invention.

The velocity signal produced by velocity signal generator 3 will have an amplitude vs. displacement characteristic in the normal operation of the system as illustrated by the graph 8 in Fig. 2. As can be seen, this velocity signal is substantially proportional to the velocity of the driven object as the object is driven away from one of its limits. One such limit is represented by zero on the abscissa at the extreme positional limit in Fig. 2. As the velocity of the driven object increases, it is assumed that the characteristic or magnitude of the speed signal developed by the generator levels off at some value of velocity. The positional signal generator produces a signal which varies in amplitude, e. g., as a sine function, substantially as the displacement of the driven object from the nearest limit point. As can be seen from Fig. 2, the positional signal characteristic 7 resembles half a sine wave. If the positional signal amplitude were to vary precisely and linearly as the driven object's displacement from the nearest limit, the characteristic would assume a triangular shape. It is not necessary to the operation of the invention that such a precisely linear positional signal be generated throughout the entire span of movement of the driven object. It is desirable, however, that the positional signal generator produce a signal having a substantially linear characteristic near each of the limits. Thus, the one-half sine wave type of characteristic shown at 7 of Fig. 2 is a suitable positional signal to afford proper operation of the system in accordance with the invention.

A comparison circuit 5, shown in Fig. 1, compares the velocity signal with the positional signal in amplitude, and when the velocity signal exceeds the positional signal, an actuating signal is generated by the comparison circuit to effect operation of the deceleration control and thereby bring the driven object to a stop or near-stop at the limit which establishes its span of movement. A comparison circuit employed in accordance with the present invention is such that a ratio of the velocity and positional signals received may be determined to establish the point at which its actuating signal will be produced and deceleration of the driven object thereby begun. This will appear more fully from a description of the operation of the apparatus of Figs. 3 and 4 which illustrate typical embodiments of the comparison circuit 5 of Fig. 1.

Figure 3:
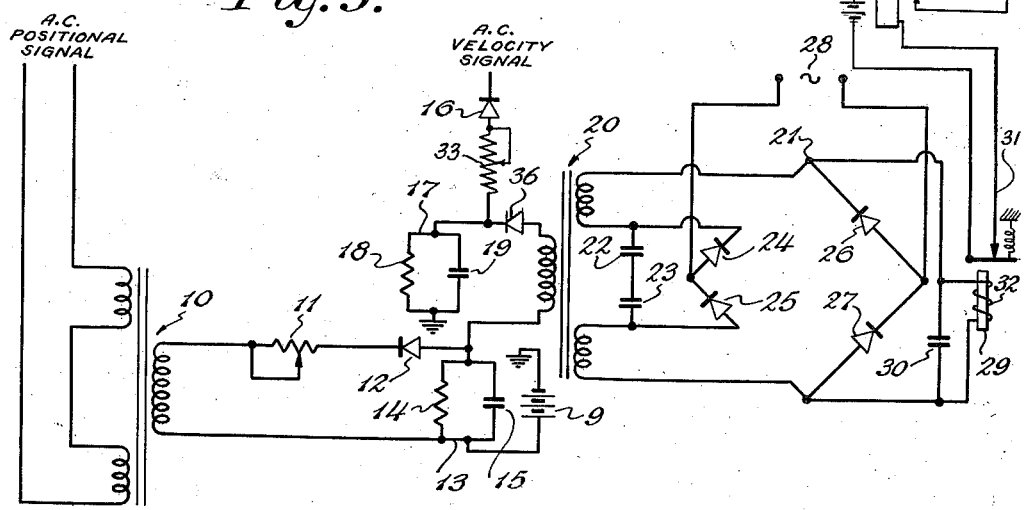
Fig. 3 is a schematic diagram of one preferred embodiment of the present invention.

With respect to the positional and velocity signals it can be seen from the velocity signal characteristic 8' in Fig. 2 that the point at which it exceeds the positional signal characteristic 7 is closer to the limit than is the analogous actuation point for characteristic 8. Dependent upon the rate of deceleration which may be achieved with the associated braking means, positional characteristic 7 may be appropriately attenuated to match the velocity characteristic at a desired cross-over actuation point. It is important, however, that the velocity signal characteristic, in an embodiment such as is illustrated in Fig. 3, should not exceed the maximum amplitude of the positional signal characteristic as does the graphic illustration of characteristics 8'' and 7 in Fig. 2. A velocity characteristic such as that shown at 8'' would actuate the deceleration means of the system prematurely, cause hunting, and possibly a malfunction of the system. If a signal of such amplitude, as is shown by the characteristic 8'' in Fig. 2, is to be utilized in accordance with the present invention, suitable attenuation means may be incorporated into the circuitry so as to render the amplitude of the respective velocity and positional signal characteristics compatible with each other, substantially in the manner shown by characteristics 7 and 8 or 7' and 8' in Fig. 2.

Assuming that the two similar generators produce signals of appropriate amplitude ranges, it may be seen from Fig. 3 that the positional signal is received in the comparison circuit by being coupled through transformer 10 from where it passes through a variable resistor 11 and is rectified by a unidirectional current means 12. The arrowhead side of rectifier 12 and the arrowhead side of the other rectifiers shown in the drawings point in the direction of electron current flow from negative to positive. A filter 13 comprising a resistor 14 and a capacitor 15 removes the ripple and smoothes the rectified positional signal. The velocity signal is received into the comparison circuit and is rectified by means of a rectifier or unidirectional current device 16 and is similarly smoothed by a filter 17, comprised of a resistor 18 and capacitor 19. A further rectifier 36 is provided between filter 17 and the upper end of an input winding of a magnetic amplifier 20 for reasons which will become more clear below.

As will be seen from the circuit connections in Fig. 3, the respective rectifying devices are so polarized that the rectifier 12 which passes a portion of the positional signal may be considered to bias rectifier 36 so that it is non-conductive when the rectified velocity signal is of lesser amplitude than the rectified positional signal. Consequently, there will be no flow through the control winding of magnetic amplifier 20 until the amplitude of the rectified portion of the velocity signal exceeds the amplitude of the rectified portion of the positional signal. When this latter state occurs rectifier 36 has a proper voltage thereacross so that current flows through the control winding of magnetic amplifier 20 with the result that an actuating current is produced by the circuit 21. This latter circuit is comprised of rectifiers 24, 25, 26 and 27 disposed in a bridge arrangement and connected in opposed polarity to a source of alternating current power 28. Because of the high impedance of the windings of the bridge arrangement of the unsaturated magnetic amplifier, 20, normally no current will flow through coil 32 of the actuating relay 29. The flow of current through the control winding of magnetic amplifier 20 will saturate the core of the magnetic amplifier and thereby reduce the impedances of the bridge windings so that current will flow through the windings 32 of a relay actuating device 29. This in turn causes the switch 31 to be actuated so as to effect operation of the dynamic braking of the driven object to be controlled. Such braking was realized in one embodiment of the present invention by short-circuiting the armature of the direct current drive motor through a resistor 66 upon such actuation, dynamically decelerating the drive motor in proportion to its speed.

When coil 32 is energized and switch 31 is actuated by being opened, a circuit including a further relay actuating coil 67 normally causing ganged switch members 68—69 to be connected to a reversible D. C. power source 71 for supplying the armature of motor 2 with power is deenergized. Upon deenergization of coil 67, the switches 68—69 revert to a contact position with respective end terminals of a dynamic braking resistor 66 which substantially short circuits the armature of motor 2. When relay coil 32 is deenergized, switch 31 closes so that coil 67 is again energized for causing switch members 68—69 to revert to their original position for connecting source 71 to the armature of motor 2. The source 71 comprises any suitable arrangement for supplying the armature of motor 2 with a voltage of one polarity for driving the motor in one direction towards one limit and then a voltage of opposite polarity for driving the motor in the opposite direction after reaching said one limit until it reaches another limit whereat the polarity of the voltage output is again reversed for driving the motor 2 back in said one direction.

A source of direct current potential is shown at 9 in Fig. 3 as being connected serially between the filter 13 and ground. The battery 9 connected between the filter 13 and ground illustrates that an outside source of bias may be applied to the comparison circuit to afford readily varied control of the operative conditions under which a deceleration control actuating signal will be produced by the comparison circuit. A variable resistor of suitable value may be connected in parallel with the source of bias to afford selection of any portion of that bias.

Similarly, the variable tap on resistor 11 may be adjusted so as to attenuate the positional signal to a more or less degree and thereby effect the operative point of the comparison circuit. An attenuation device such as variable resistor 33 in the velocity signal circuit affords variation of the velocity signal amplitude adjusting the point of actuation of the deceleration control by the comparison circuit.

It should be noted that Fig. 3 shows a comparison circuit apparatus in accordance with the present invention which receives positional and velocity signals both of the alternating current type. It is not necessary, however, that these signals be of alternating current type, but they may be direct current type or a combination of both.

As is shown in Fig. 4, one signal may be direct current type and the other alternating current. The positional signal is shown in Fig. 4 as being received from an alternating current synchro, and is coupled into the comparison circuit by a transformer 40, the secondary winding of which is connected to the grids 42 and 43 of an electron tube 41 of a duo-triode type. The plates of the duo-triode are connected to an appropriate source of B+ potential as is indicated. The cathodes of the tubes are connected through resistors 46 and 47 to a source of B− potential as is indicated schematically in the drawing of Fig. 4. The operation of the duo-triode stage is such that when no current is drawn by the tube, substantially the entire B− potential is present at the common cathode connection 45. The potential of this point rises, however, in proportion to the current flow through the electron tube 41. Thus an increasingly positive input signal upon grids 42 and 43 will cause increased current flow and an increasingly positive potential at 45, so that the cathode potential follows that of the grid input to produce a bi-polarity output correlated to the input. The A. C. input signal to the grids 42 and 43 thus causes a signal proportional thereto to be developed across resistors 46 and 47, alternating from positive to negative values about a median substantially at ground potential. A common cathode connection coupled through a capacitor 48 and a variable resistor 49 connects two oppositely poled rectifiers 51, 52 each of which performs a function similar to that of the positional signal rectifier previously described in connection with Fig. 3.

Thus it may be seen that the vacuum tube 41 operates as a cathode follower and affords a high input impedance for the signal induced on the secondary winding of transformer 40. It effectively isolates the positional synchro from the remainder of the system obviating in large measure the possibility of receiving undesirable reflections from the comparison circuit. Associated with each of the oppositely poled rectifiers 51 and 52 are respective filters 53 and 54. These filters are of parallel RC type and smooth the respective half-wave rectified alternating current positional signal. A direct current velocity signal is shown as being received in the comparison circuit of Fig. 4 and connected to oppositely poled rectifiers 55 and 56. The velocity signal rectifier 55 has a coil winding connected between it and the positional signal rectifier 51. In similar arrangement a coil winding is connected serially between the oppositely poled velocity signal rectifier 56 and positional signal rectifier 52.

Fig. 4 illustrates dual signal paths either of which, when current is caused to flow therethrough, will energize the bridge type magnetic amplifier and actuate the operation of the deceleration control in a manner similar to that already described in connection with Fig. 3. The reason for a dual signal path in this particular embodiment is that the direct current tachometer signal received by the apparatus illustrated in Fig. 4 is of the type which produces a direct current output signal polarized in accordance with the direction of movement of the object which drives the tachometer. There must therefore be means of comparing the amplitude of either a negative direct current velocity signal or a positive direct current velocity signal with like polarity rectified positional signals. This is accomplished by separate rectification of each half wave of the alternating current positional signal and its subsequent comparison with the direct current velocity signal of appropriate polarity. It is, of course, not necessary to the operation of the instant invention that the reversibly polarized velocity signal be employed. For any one of several reasons beyond the scope of this invention and which do not appear herein, it may be advantageous in a radar system to drive a tachometer that will produce a velocity signal polarized in accordance with the direction of movement of the driven object. This signal may be used for other purposes in addition to those elaborated hereinbefore in connection with the description of the operation of the invention. The type of signal received in Fig. 4 is therefore specified to illustrate that the invention may be employed with varying types and polarities of signals.

However, for at least one type of velocity signal characteristic, the polarized velocity signal generator output may be utilized to advantage in a particularized embodiment in accordance with the present invention. If the acceleration of the driven object is such that it will produce a signal having a very sharply rising characteristic as is shown at 60 in Fig. 5, the system will tend to intermittent drive operation as has previously been explained. One way in which this undesirable condition may be circumvented is to make use of the polarized sense of the velocity signal. As is shown in Fig. 6, an electrical switch 63 and a time delayed polarized relay 62 controlled by a D. C. tachometer signal may be interposed between the velocity signal generator and rectifiers 55 and 56, and the velocity signal thus disconnected from the comparison circuit by means of the polarized relay 62. The time delay insures that the velocity signal is not compared with the positional signal until after the critical initial period where it exceeds the positional signal in amplitude. In an alternative arrangement, a mechanically operated switch, such as that shown at 37 in Fig. 1, is actuated by cams 38 and 39 or similar devices positioned on the driven apparatus so that the comparison circuit is disconnected from the velocity signal until a desired amplitude of signal is realized and proper operation is assured. The duration of this disconnected state can be determined by the size and shape of cams 38 and 39, or by the delayed action of switch 37 and it may be for as much as the elapsed time during the first one-half of the driven object's movement between its established limits. The relative positioning of a mechanical actuating device or the amount of time delay interposed by a polarized relay is proportioned to give smooth operation in accordance with the principles outlined above and the velocity and positional signal characteristics of each particular system.

The resistor 49 shown in Fig. 4, has a variable tap 50 which offers means for attenuation of the entire alternating current positional signal so as to avail a choice of signal ratios of the respective received signals which will initiate operation of the deceleration means.

The relationship of the values of these resistances to the deceleration problem to be solved in accordance with the present invention will be evident from the following theoretical analysis. Assuming that the velocity signal generator produces a signal of $K_t$ volts/degree/second, that the positional signal generator produces a signal of $K_s$ volts/degree from the nearest limit, and that the rate of deceleration of the driven object is $K_c$ degrees coast/degree/sec., it may be seen that it is desirable to have $$K_c = \frac{K_t}{a} K_s$$

where "$a$" is the ratio of the potential developed across resistor 14 as related to the total potential across resistor 14 and resistor 11 of Fig. 3. These two resistors act in the manner of a voltage divider and "$a$" may be expressed as $$a = \frac{R_{14}}{R_{11} + R_{14}}$$

Since the values of the signals generated are all ascertainable, and the rate of deceleration is known, the desired values of resistors may be readily calculated. Variable taps may be utilized on the resistors to conform the operation of the comparison circuit to widely different conditions.

It is, of course, apparent that one or more independent sources of bias may be connected to the comparison circuit of Fig. 4 in an appropriate manner similar to the battery 9 shown in Fig. 3, so as to offer still another means of varying the ratio of received positional and velocity signals which will actuate the deceleration control means to brake the movement of the driven object.

Though the specific embodiments of the present invention illustrated in Figs. 3 and 4 comprise a magnetic amplifier as an actuating signal generator, any suitable means meeting the need for stability and reliability of operation may be employed.

The electronic isolation afforded by the interposition of a cathode follower between the coupling means which receives the positional signal and the associated rectifying means is usually desirable, but it may be eliminated if such isolation is found to be unnecessary in a particular application of the present invention.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A system for controlling an object in its approach to a limit-stop comprising means to drive said object, means to produce an electrical signal which is a function of the displacement of said object from said limit stop, means to produce an electrical signal which is a function of the velocity of said object, means to compare said signals and produce an actuation signal at a determinable ratio of said compared signals, and means responsive to said actuation signal to decelerate said driving means.

2. A dynamic control system for controlling an object between two limits comprising means to drive said object, means to produce an electrical signal substantially proportional to the displacement of said object from the nearest limit point, means to produce an electrical signal proportional to the velocity of said object, means to compare said signals and produce an actuation signal at a determinable ratio of said compared signals, and means responsive to said actuation signal to control said driving means.

3. A dynamic control system for controlling an object between two limits, comprising means to drive said object, means to produce an electrical signal substantially proportional to the displacement of said object from the nearest limit point, means to produce an electrical signal proportional to the velocity of said object, means to compare said signals and produce an actuation signal at a determinable ratio of said compared signals, and means responsive to said actuation signal to decelerate said driving means.

4. A control system in accordance with claim 3, said comparison means including bias means, whereby the amplitude and polarity of said bias determines the ratio of said signals which will decelerate said driving means.

5. A dynamic control system in accordance with claim 3 in which said decelerating means is responsive to a ratio of said displacement signal to said velocity signal correlated to the rate of deceleration of said driving means.

6. A limit-stop system for controlling an object between two limits comprising means to drive said object, means to produce an alternating current signal substantially proportional in amplitude to the displacement of said object from the nearest of said limits, means to produce an alternating current signal proportional in amplitude to the velocity of said object, means to rectify at least one half-wave portion of each of said respective signals, means to compare said rectified signals and produce an actuating signal at a determinable ratio of said compared signals, and means responsive to said actuation signal to decelerate said driving means.

7. A limit-stop system in accordance with claim 6 in which said respective rectifying means rectifies half-wave portions of said velocity and displacement signals of like polarity.

8. A limit-stop system in accordance with claim 6 including filter means adapted to smooth and filter the direct current output of each said rectifying means.

9. A limit-stop system in accordance with claim 8 including a resistor connected serially between each of said signal sources and its associated filter means, said filters each comprising a parallel resistor-capacitor network, whereby the relative values of said series resistors and said parallel resistors determine the ratio of said signals which will decelerate said driving means.

10. A limit-stop system for controlling an object between two limits comprising means to drive said object, means to produce an electrical signal substantially proportional to the displacement of said object from the nearest of said limits, means to produce an electrical signal proportional to the velocity of said object, means to compare said signals and produce an actuation signal at a determinable ratio of said compared signals, said last-named means including a high input impedance device to receive said positional signal, whereby to isolate said positional signal means from said comparison means, and means responsive to said actuation signal to decelerate said driving means.

11. A limit-stop system for controlling an object between two limits comprising means to drive said object, means to produce an alternating current signal substantially proportional in amplitude to the displacement of said object from the nearest of said limits, means to produce a direct current signal proportional to the velocity of said object, means to rectify said alternating current signal, means to compare said rectified positional signal with said direct current velocity signal and produce an actuation signal at a determinable ratio of said compared signals, and means responsive to said actuation signal to decelerate said driving means.

12. A limit-stop system in accordance with claim 11 including a resistor connected serially between said positional signal source and said rectifying means, and filter means comprising a resistor-capacitor parallel network in parallel with the output of said rectifying means, whereby the relative value of said series resistor and said parallel resistor of said filter means determine the ratio of said signals which will decelerate said driving means.

13. A limit-stop system for controlling an object between two limits comprising means to drive said object, means to produce an alternating current signal substantially proportional in amplitude to the displacement of said object from the nearest of said limits, means to produce a direct current signal proportional in amplitude to the velocity of said object and polarized in accordance with the direction of movement of said object, means to separately rectify the negative and positive half-waves of said alternating current signal, means to compare like polarity signals derived from said two last-named means and produce an actuation signal at a determinable ratio of compared like polarity signals, and means responsive to said actuation signal to decelerate said driving means.

14. A system in accordance with claim 13 including polarity responsive, relay-actuated switch means connectably disposed between said velocity signal generator and said comparison means, said switch means being adapted to connect said velocity signal generator to said comparison means after a determinable time delay.

15. A system in accordance with claim 13 including switch means connectably disposed between said velocity signal generator and said comparison circuit, and means to actuate said switch means at a determinable time delay after the change of polarity of said velocity signal.

16. A system in accordance with claim 13 including a switch means connectably disposed between said velocity signal generator and said comparison circuit, and means positioned on said driven object to actuate said switch means at a determinable point of movement of said object between said limits.

17. A servo mechanism system comprising an object to be driven in oscillatory motion between two limits, reversible driving means including a source of power for driving said object in one direction until it reaches one of said limits and then driving said object in an opposite direction until it reaches the other of said limits, first generator means for providing an electrical signal whose amplitude at any particular time is a direct function of the displacement of said object from the nearest of said limits at such a time, second generator means for providing an electrical signal which is a direct function of the velocity of said object, means coupled to said first and second generator means for comparing said signals and producing an actuation signal at a determinable ratio of said compared signals, and means responsive to said actuation signal for decelerating said driving means as said object approaches either limit of its oscillatory path.

18. A servo mechanism system in accordance with claim 17, wherein said driving means is a direct current motor, and said deceleration means includes means for substantially short circuiting the armature of said direct current motor in response to said actuating signal for dynamically braking said motor as a function of the speed and position of said object relative to its nearest limit.

References Cited in the file of this patent

UNITED STATES PATENTS 2,648,038    Morse et al. _____ Aug. 4, 1953